March 17, 1936.    R. M. HEINTZ    2,034,434
BASING CEMENT
Filed Dec. 17, 1934
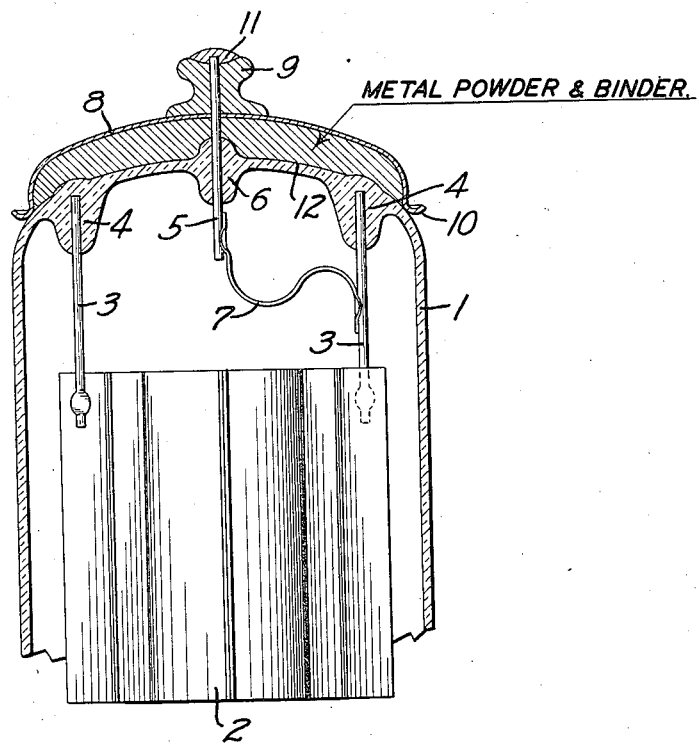
INVENTOR,
RALPH M. HEINTZ.
BY
Lippincott & Metcalf
ATTORNEYS.

Patented Mar. 17, 1936

2,034,434

UNITED STATES PATENT OFFICE 2,034,434

BASING CEMENT

Ralph M. Heintz, Palo Alto, Calif., assignor to Heintz & Kaufman, Ltd., San Francisco, Calif., a corporation of Nevada Application December 17, 1934, Serial No. 757,753

1 Claim. (Cl. 250—27.5)

My invention relates to a basing cement, and more particularly to a cement which is adapted to be used in fastening bases or other caps to thermionic tube envelopes, especially those which are operated at high power outputs.

Among the objects of my invention are: to provide a basing cement adaptable for use in conjunction with the thermionic tubes of high power and consequent high heat radiation; to provide a cement for attaching a metal cap to a thermionic tube envelope wherein the major portion of the cement is a metallic powder; to provide a basing cement wherein the major portion is a metallic powder having high heat conductivity; and to provide a basing cement interposed between a metallic cap and the envelope of a thermionic tube which will form a reflecting surface at the point where it contacts the refractory envelope.

Other objects of my invention will be apparent or will be specifically pointed out in the description forming a part of this specification, but I do not limit myself to the embodiment of the invention herein described, as various forms may be adopted within the scope of the claim.

In its broadest aspect, my invention comprises a basing cement adaptable for use in conjunction with thermionic tubes, comprising a major portion of a finely divided metal powder held together by a minimum of binder.

Basing cements have been in use for many years for applying, for example, incandescent lamp bases to the lamp envelopes, and for applying bases to thermionic tubes of various kinds, such as vacuum tubes, rectifiers, mercury arcs and similar devices. Within the last few years it has become relatively common to bring certain of the thermionic tube leads through the envelope at a point remote from the usual stem with its accompanying press thereon, and to cover or otherwise surround such a remote lead by a metallic connector cap. This cap is then cemented to the envelope in its proper position by means of the same general type of cement as is used for the bases; hence in the instant specification the words "basing cement" will be deemed to apply to a cement which is useful to attach any such cap or base to any portion of a thermionic tube envelope.

While there has been a large number of basing cements of various kinds in use, the usual formula comprises whiting, sand and shellac. Sometimes the shellac is replaced by other gums having similar characteristics.

In applying the base to an envelope, the base is positioned on the envelope with a proper amount of cement between the two and held in proper relative position during a baking period. During this baking the volatile components of the shellac or other binder are evaporated, the shellac is melted somewhat, and upon cooling the cement solidifies into a hard mass which has good adhesive qualities as far as both the glass and the metal are concerned. Such materials were satisfactory for tubes of small powers, but when tubes of large outputs were developed these cements became impractical. Such tubes, therefore, are usually operated without any caps at all, connection being made directly to the leads.

If caps are to be applied to such high powered tubes, using prior cements, it is found that the mass of hardened cement is a relatively good heat insulator. The result of the insulating effect of the cement is that hot spots develop in that portion of the envelope beneath the cement as the heat cannot be conducted away as fast as it accumulates. Furthermore, such a local heating of the envelope would be dangerous in any event, but as most of the caps which are placed upon envelopes of this type surround and protect a lead seal passing through the envelope, such heat greatly endangers the integrity of such a seal and often causes cracks and consequent failure. The reason for such seal failures has many times been obscure, but I have found that a great many of them may be directly traced to the effect described above. I have, therefore, in order to avoid such contingencies, provided a cement which not only is a good heat conductor, preferably as good as the metal of the cap itself, but one which will form a reflective surface when in contact with the glass, thereby preventing heat accumulation beneath the cap.

One preferred form of my cement is made up from bright aluminum powder mixed with shellac or a synthetic resin varnish. I prefer to use just enough of the binder to hold the powder particles together and to provide a proper bond, so that when the cement has been baked and the volatile components of the binder removed, the mass which remains is, for all practical purposes, a solid mass of aluminum having substantially the same heat conductivity as aluminum. The uniting action of the cement is not impaired.

I have found, however, that there is no virtue in aluminum per se, in that any metallic powder having good heat conductivity is perfectly satisfactory. For example, there are certain finely divided forms of iron, copper, bronze and nickel which afford sufficiently good heat conductivity to provide the desired results. I have also found that the nature of the binder is not important, any binder being satisfactory which is heat-resistant and which will create the proper bond.

It should be noted that I prefer a bright powder. The reason for this is that such a powder, when placed in contact with a refractory glass envelope, solidifies thereon with an extremely shiny and reflective surface next to the glass. This surface provides an additional benefit in that some of the heat is reflected away from the cement and the cap.

Referring to the drawing which shows an illustrative section of a thermionic tube having a cap attached thereto by the cement of my invention, a refractory envelope 1, preferably of glass or quartz, is provided with an anode 2 suspended from one end of the tube by anode supports 3 through the medium of envelope seals 4.

An anode lead 5 passes through the envelope at an anode seal 6, the lower end being connected to one of the anode supports by a flexible connection 7. A connector cap 8, preferably stamped or otherwise fashioned from a thin metal such as copper, iron, brass or nickel, is provided in its central portion with a connection stud 9, both the cap and the stud being bored to receive the outer end of the anode lead 5.

In assembly the lead 5 is inserted through the cap and the stud and the cap pressed to have its rim 10 in contact with the envelope, a quantity of my cement being placed therebetween. I may then prefer to hold the cap in place temporarily by a quantity of solder 11, which may be replaced in high powered tubes by a weld or by a small amount of brazing compound, or I may use the usual basing machine to correlate the parts. The tube is then placed in an oven and baked until the cement has solidified. Upon removal from the oven it will be found that the cap adheres strongly to the glass; and furthermore, if a bright metal powder has been used for the main body of the cement, that the surface 12, which is formed by the contact of the glass with the cement, is highly reflective.

In making up the preferred form of my cement I prefer to take bright finish aluminum powder and gradually stir therein just sufficient binder to create a thick, sticky mass. I desire to use just enough binder to coat the particles of the mass so that when the baking process is over there are no sizable portions of the cement which are composed of binder, and I do not desire to have any substantial amount of shrinkage occur in the mass as no substantial voids should be formed in the mass. When such a procedure is followed, using a minimum of cement, the resultant hard mass formed after baking is substantially a mass of aluminum, as far as the desired characteristics are concerned.

I am fully aware that there are cellulose cements on the market which have therein a small proportion of aluminum powder, these cements usually going by the name of "liquid solders". My cement, however, differs from those cements in that their major portion is binder. They also have a large amount of volatile thinner intermixed therewith so that there is a tremendous shrinkage taking place during the drying of the cement. Snuch a cement would be utterly impractical for a tube cement where, as I have pointed out above, I desire an absolute minimum of binder in order to obtain a cement which does not have any substantial shrinkage and which, when baked, has the physical characteristics, as far as reflection and conduction of heat are concerned, of a solid mass of metal.

It should be noted that the envelope material beneath a cap cemented to the envelope by the cement of my invention may often run slightly cooler than the remainder of the envelope, due to the better radiating characteristics of the cap material, the heat passing readily through the cap material into the ambient air. I have, therefore, provided a cement which can be used in tubes of large powers and where the presence of the cement does not, in any way, endanger the seals, in fact the seals are greatly protected thereby.

I claim:

In a thermionic tube envelope having a metallic cap applied thereto, a layer of cement between said cap and said envelope having substantially as good a heat conductivity as that of the metal of said cap and forming a reflective surface in contact with the exterior surface of said envelope.

RALPH M. HEINTZ.